(12) United States Patent
Schödlbauer et al.

(10) Patent No.: US 6,552,533 B2
(45) Date of Patent: Apr. 22, 2003

(54) POSITION SENSOR FOR DETERMINING THE POSITION OF A MOVING OBJECT

(75) Inventors: Dieter Schödlbauer, München (DE); Reinhard Hochholzer, Höhenkirchen (DE)

(73) Assignee: Ruf Electronics GmbH, Hohenkirchen (DE)

(*) Notice: Subject to any disclaimer, the term of this patent is extended or adjusted under 35 U.S.C. 154(b) by 0 days.

(21) Appl. No.: 09/747,632

(22) Filed: Dec. 22, 2000

(65) Prior Publication Data

US 2003/0056583 A1 Mar. 27, 2003

(30) Foreign Application Priority Data

Dec. 22, 1999 (DE) .......................... 199 62 241

(51) Int. Cl.⁷ ................ G01B 7/30; G01D 5/12
(52) U.S. Cl. ................. 324/207.22; 324/207.25
(58) Field of Search ............. 324/207.22, 207.25, 324/173, 174; 74/492, 495, 501.5, 501.5 R

(56) References Cited

U.S. PATENT DOCUMENTS

| 5,146,173 A | 9/1992 | Jurkewitz |
| 5,930,905 A | 8/1999 | Zabler et al. |
| 6,018,318 A | 1/2000 | Schödlbauer |
| 6,181,129 B1 * | 1/2001 | Message et al. ....... 324/207.25 |

FOREIGN PATENT DOCUMENTS

| DE | 28 49 918 | 7/1979 |
| DE | 195 06 938 A1 | 2/1995 |
| DE | 197 47 753 C1 | 10/1997 |
| DE | 198 49 554 C1 | 10/1998 |
| EP | 0 386 334 A2 | 12/1989 |
| FR | 2 697 081 A1 | 4/1994 |

* cited by examiner

Primary Examiner—Walter E. Snow
(74) Attorney, Agent, or Firm—Senniger, Powers, Leavitt & Roedel

(57) ABSTRACT

A position sensor to determine the absolute position of an object features a rotary position sensor with a tooth gear, which is resiliently and elastically tensioned against a toothing on the moving object.

8 Claims, 11 Drawing Sheets

POSITION SENSOR FOR DETERMINING THE POSITION OF A MOVING OBJECT

BACKGROUND OF THE INVENTION

The invention pertains to a position sensor. A position sensor of this kind is known, for example, from EP 0386334 A2. The position of an adjustment drive unit, as described therein, is ascertained with two rotary potentiometers, each of which is linked by means of a gear to a toothed gear of a shaft. Both potentiometers are called "endless" potentiometers which can execute an unlimited number of complete rotations (through 360°). The counting of the toothed gears is determined in that as one potentiometer performs a number n of complete rotations over a specified measuring range, the other potentiometer performs a number of complete rotations that differs by 1 (n−1 or n+1). Then from the phase difference in the output signals of the two potentiometers, an absolute position signal can be determined.

Similar position sensors are also described in FR 2697081 A1, in DE 195 06 938 A1 and in the older, unpublished DE 198 49 554.

One method for high precision evaluation of two rotary position sensors is also found in DE 19747753 C1.

One specific area of application of the invention is a steering angle sensor in motor vehicles that determines the rotational position of the steering shaft which can perform several rotations. In principle, the invention can also be used on linear sensors in which a linearly moving gear rack is coupled to the toothed gear of the rotation position sensor.

The measuring accuracy depends, in part, on the precision of the toothing. Toothed gears and gear racks can have some play due to manufacturing tolerances, assembly tolerances pertaining to the shaft spacing, and also due to wear; in the more general sense, this is called the "slip," and it is a source of measuring errors. During a reversal in the direction of direction of the rotary sensor, this error manifests as hysteresis error. An additional source of error in toothed gears and gear racks is lack of uniformity in the shape of the teeth as well as gaps between teeth, and also in irregularities in the distribution of the teeth, which, in turn, leads to errors in linearity in play-free engagement of the teeth. This also applies to unrounded toothed gears, which has as a result, that play is present in some regions of rotational adjustment and not in the case of other ranges of rotational adjustment. It must be taken into account that in most measurement applications, plastic toothed gears are being used.

SUMMARY OF THE INVENTION

It is the purpose of the invention to improve the position sensor of the initially mentioned type, so that measurement errors can generally be prevented, and at least reduced in magnitude.

The basic principle of the invention consists in providing a resilient, elastic tension of the toothed gear linked with the rotation position sensor, with respect to the toothing linked to the moving object.

The advantage achieved is that the shaft spacing between the driving and the driven shafts of the toothed gears or toothing of the position sensor is variable, and that the coupled toothing will always be optimally engaged. Thus, for many gear shapes (such as in an involute toothing, for example), at least one tooth of the toothed gear is engaged with its leading and its following flank with the corresponding flanks of the opposing teeth. Any play, slip in the sense discussed above, or dead play will thus be eliminated.

Preferably, the moving object is a rotary shaft and the toothing is a driven toothed gear connected to the shaft, with which two rotary position sensors are coupled by means of driven toothed gears. The rotary position sensors are seated in bearings and the bearings are pressed in the direction of the shaft by means of resilient, elastic tensioning bars.

An optimum force distribution is obtained when the shafts of rotation of the rotary position sensors and the shaft are located in a common plane.

An even better force compensation is obtained when the rotary position sensors are seated on a common bearing and the bearing is connected by means of resilient, elastic tension bars to an additional bearing which is braced against the driven toothed gear by means of an additional driven toothed gear. Then, preferably all driven toothed gears are tensioned in the direction of the midpoint of the driven toothed gear.

According to one refinement of the invention, the driven toothed gears are fixed in place by a position-retaining bearing and tensioning element with respect to the driven toothed gear, so that its rotational axis is kept in fixed position in the perimeter direction of the driven toothed gear and can only move radially with respect to the midpoint of the driven toothed gear.

Furthermore, the driven toothed gears, the bearings and the tension bar are preferably designed as a structural unit, which can slide nearly along a retaining plate.

According to an additional refinement of the invention, which can be used for general applications and not only in conjunction with the above properties, to increase the dependability of the position sensor on a new component, an error signal that is proportional to the measuring error of the position sensor is ascertained at the factory. This error signal and a specified limit value are stored. Then, during subsequent operation, a current error signal is determined and a check is made to determine whether the two error signals differ by more than the stored limit value, whereupon a warning signal will be generated.

To reduce computation time, the error signal ascertained at the factory is determined only for a specified rotational position, preferably the middle position, and the check of the current error signal likewise occurs only at this previously specified rotational position.

BRIEF DESCRIPTION OF THE DRAWINGS

The invention will be explained in greater detail below, based on an embodiment example with reference to the drawing. It shows FIG. 1, a top view of a position sensor to ascertain the rotary position of a shaft by use of a single rotary position sensor FIG. 2, a top view of a position sensor to ascertain the rotary position of a shaft that uses two rotary position sensors whose axes of rotation are located in the plane of the axis of rotation of the shaft.

Identical or corresponding parts in the figures have the same reference numbers.

DETAILED DESCRIPTION OF THE PREFERRED EMBODIMENT

Figure 1:
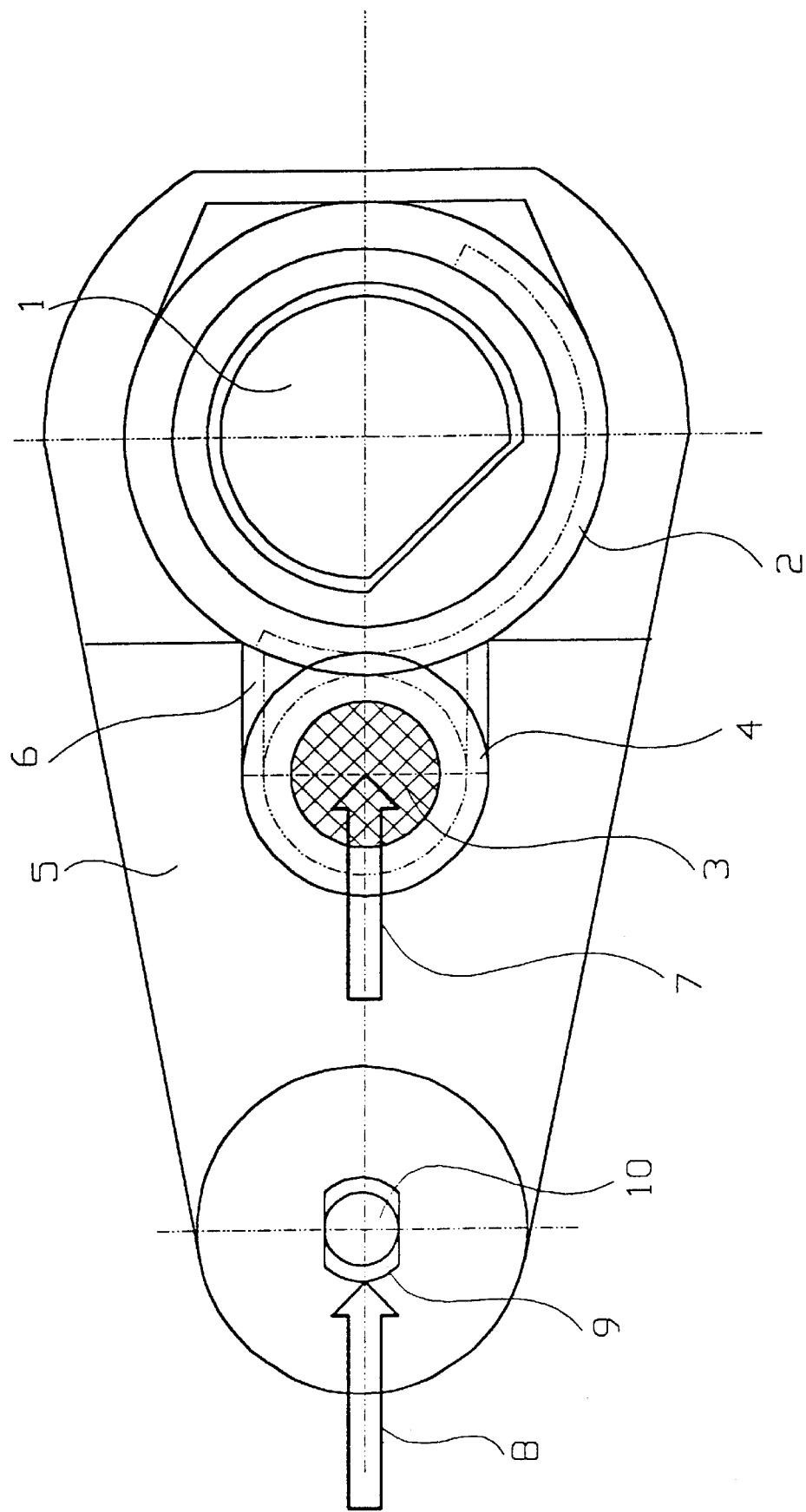

FIG. 1 shows a rotary shaft 1, which can be the steering column of a motor vehicle, for instance. A toothed gear 2 is securely attached to this shaft and this gear is engaged with a toothed gear 4, which, in turn, is coupled to a moving part 3 (hereinafter called a rotor 3) of a rotary position sensor. Here, the toothed gear 2 is the driving gear, and the toothed gear 4 the driven gear. The toothing of the driven toothed gear 2 does not travel completely around the entire outer circumference of the shaft, but rather is limited to the measurement range of interest.

The rotor 3 is seated on a bearing 5 which is braced against the shaft 1 or the driven toothed gear 2, and the bearing 5 is configured so that the axial spacing between the axis of rotation of the sensor 3 and the axis of rotation of the shaft 1 is variable. According to one variant, the bearing element has a bearing 6 for the rotor 3 in the form of an elongated hole, so that the rotor 3 can be displaced within this elongated hole 6 and can be pressed by a resilient, elastic tensioning force (as indicated by the arrow 7) against the diving toothed gear 2. According to another variant, which is also represented in FIG. 1, the rotor 3 is fixed in place with respect to the bearing 5, so that the entire bearing element plus rotor 3 can be displaced relative to the shaft and to the driving toothed gear 2. In this case, a tensioning force, as illustrated by the arrow 8, is exerted upon the bearing, and specifically in a direction so that the driven toothed gear 4 is pressed against the driving toothed gear 2.

During installation, the bearing 5 is braced against a pin 10 fixed in place relative to the shaft 1 through an elongated hole 9, the pin acts to counteract twisting. The tension force 8 will then act between the pin 10 and the bearing 5, for example.

Thus in general the driving toothed gear 2 and the driven toothed gear 4 are pretensioned aghast each other by an elastic spring force, so that the teeth of the two toothed gears 2 and 4 are mutually engaged without free play.

Figure 2:
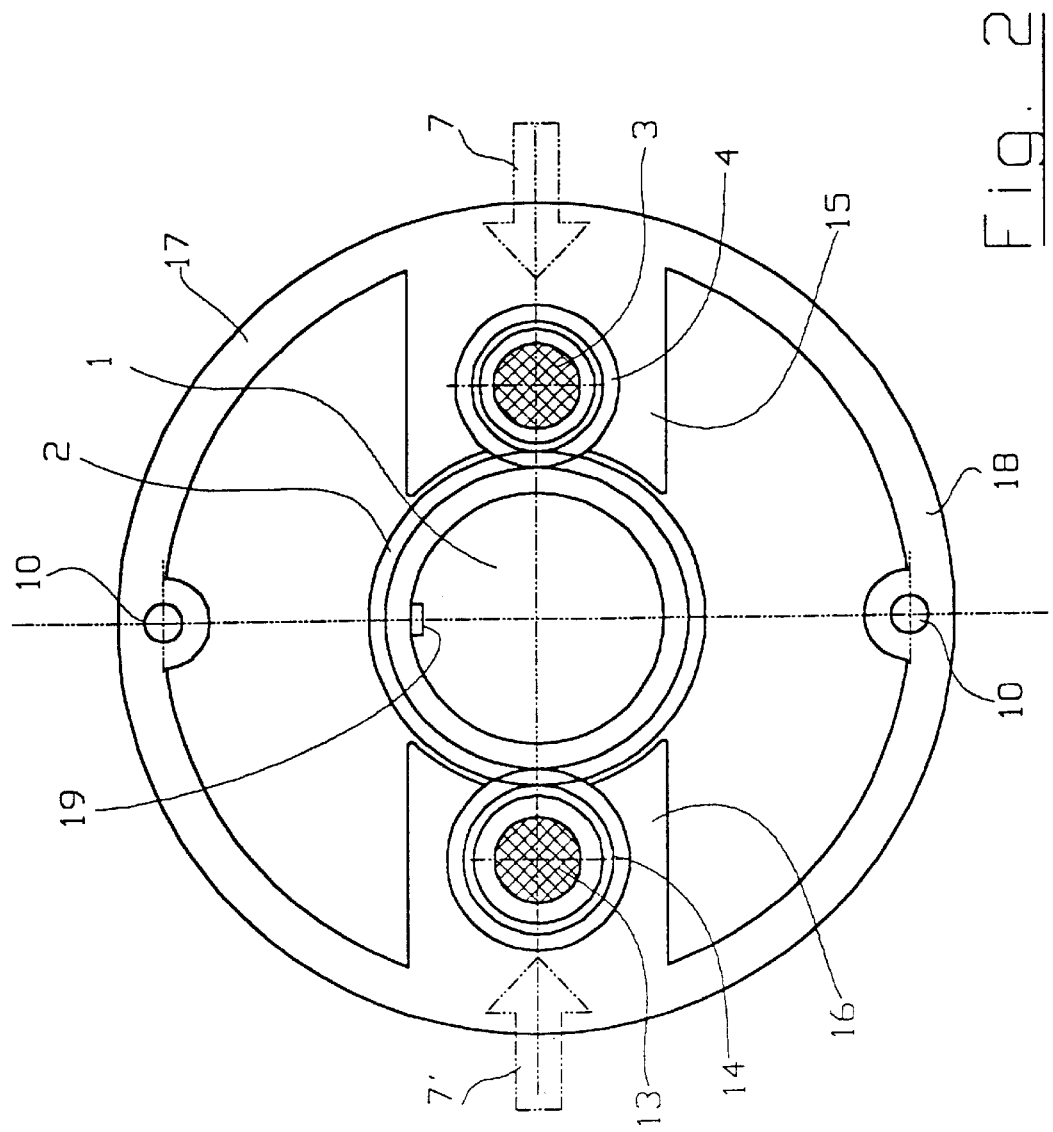

FIG. 2 shows a refinement of the invention with two moving parts 3 and 13 of rotary position sensors, each of which is coupled via a toothed gear 4 or 14 to the toothed gear 2 of the shaft 1. The axes of rotation of the two rotors 3 and 13 are opposite each on either side of the toothed gear 2, so that the three axes of rotation of the rotors 3 and 13 and of the shaft 1 are located in one plane. The two rotors 3 and 13 are each held in a bearing element 15 and 16, respectively. Both bearings 15 and 16 are attached together by means of resilient, elastic tension bars 17 and 18, so that the tension bars exert a tension force in the direction of the arrows 7 and 7', and thus press the two rotary position sensors 3 and 13 in the direction of the middle of the shaft 1. Here, again, fixed-position pins 10 and 10' are used, which engage in holes of the tension bars 17 and 18 and hold the bearings 15 and 16, and thus the rotors 3 and 13, in such a way as to counteract twisting relative to the axis of rotation of the shaft 1.

The technology of the rotary position sensors can be chosen according to any method of the prior art. The only requirement is that it create a linear output signal along a specified path or angle range, where said signal must be repeated periodically in the useful range. For example, Hall sensors, potentiometers, or other known sensors can be used. In this manner, an electronically effective measuring range can be covered which can be much greater than the period of a single sensor, but without requiring costly step-down gearing. In particular, absolute synchro-transmitters can be created which are suitable for position recognition over several rotations. In principle, the use of conventional potentiometers is not precluded, although, preferably, contactless position indicators are used. One suitable type is described in DE 197 47 753 C1, for example.

Figure 3:
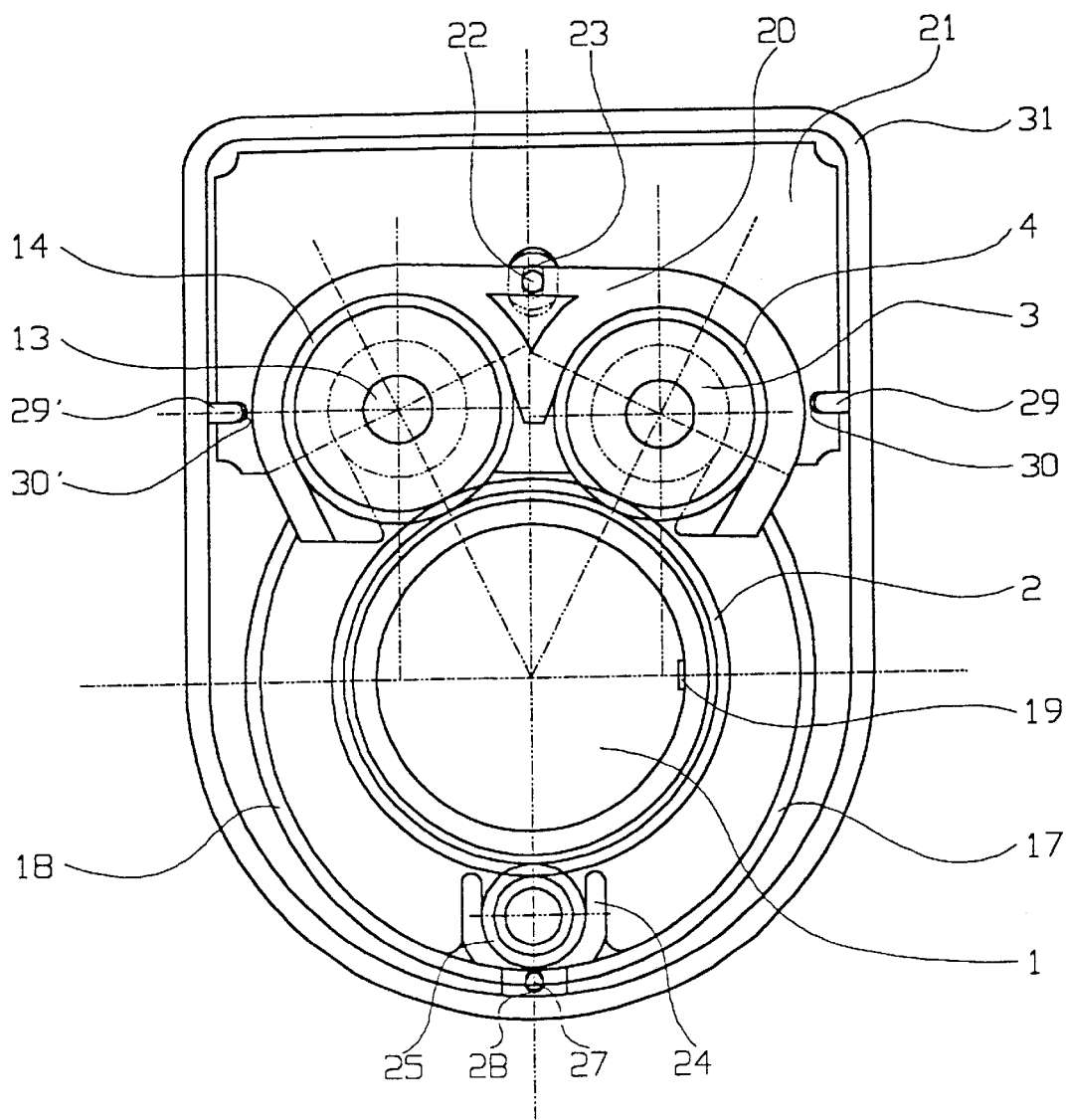
FIG. 3, a position sensor to ascertain the rotary position of a shaft by use of two rotary position sensors according to another embodiment example of the invention.

FIG. 3 shows an additional variant of the invention, in which the two rotors 3 and 13 are seated by their toothed gears 4 and 14 against a common bearing element 20, where this bearing is connected by means of two resilient, elastic tension bars 17 and 18 to an additional bearing element for a toothed gear 25, and where this toothed gear 25 likewise engages with the toothed gear 2. The toothed gear 25 is used as a support gear, which ensures that the toothed gears 4 and 14 are pressed radially in the direction of the midpoint or toward the axis of rotation of the toothed gear 2. The bearing elements 20 and 24, and also the two tension bars 17 and 18, form an enclosed annular element around the toothed gear 2, and this annular element is made preferably of plastic. The bearing element 20 can be displaced linearly along a retaining plate 21 by means of a pin 22 and an elongated hole 23, and the retaining plate 21 can be displaced in a housing 31, and specifically is held against the plate 21 by means of pins 29 and 29' separated from the housing wall and by corresponding recesses 30 and 30'. Finally, the bearing 24 is also displaceable by means of a pin 27 attached to the housing and an elongated hole 28 in such a way that the bearing element can only be displaced radially in the direction of the midpoint of the toothed gear 2, but not in the circumferential direction, so that the pins 27 and 22 counteract twisting.

As shown in FIG. 3, the two toothed gears 4 and 14 have different diameters and thus a different number of teeth. The toothed gear 2 is held securely against the shaft 1 with a tongue-and-groove connection 19.

Figure 3A:
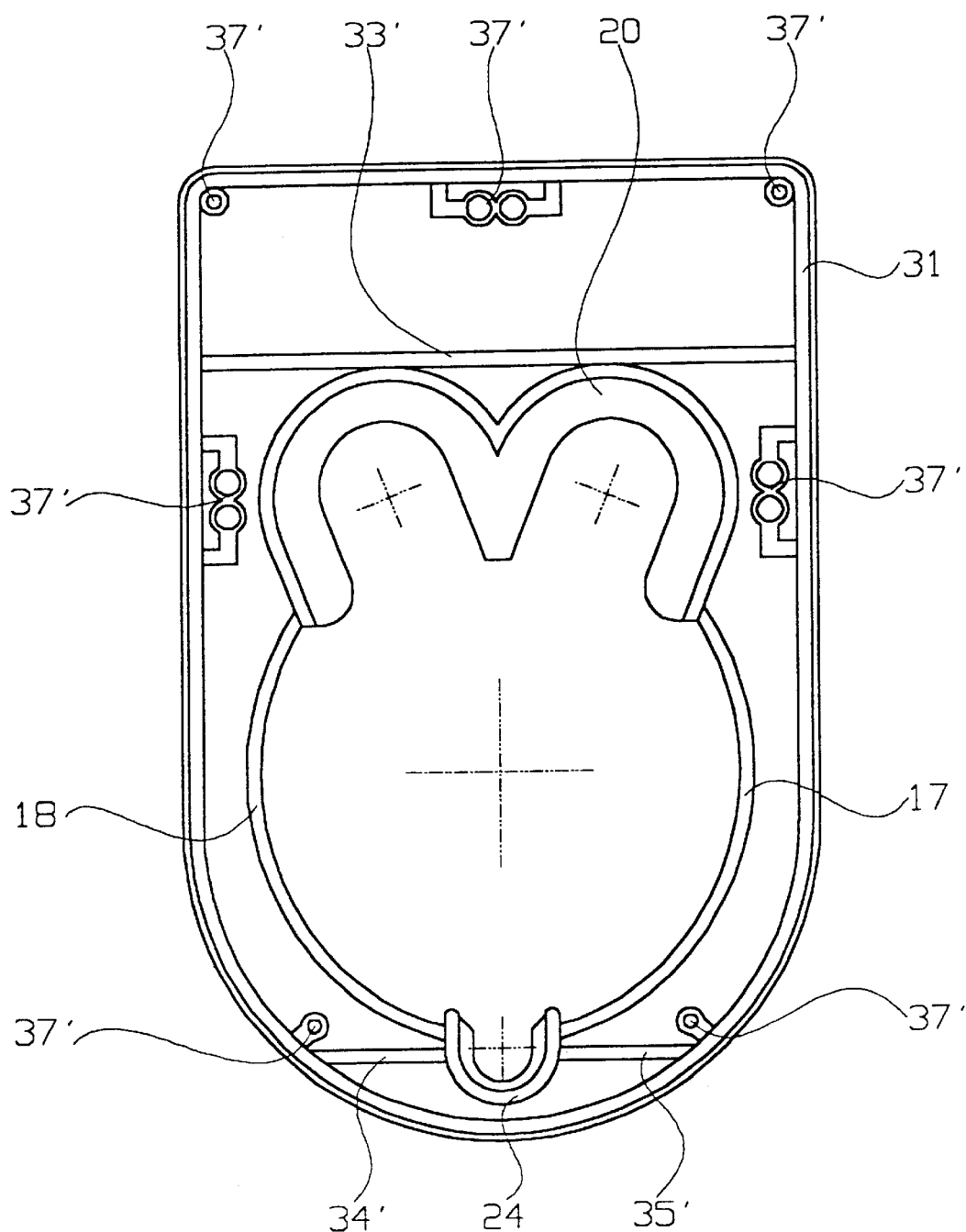
FIG. 3A, a housing of a position sensor similar to FIG. 3, according to another embodiment example of the invention.

FIG. 3A shows a top view of a housing 31 of the position sensor, which is designed here as a singlepiece, plastic, injection-molded part. The housing has a frame to which the bearings 20 and 24 are held via resilient, elastic bars 33' or 34' and 35', respectively. Here, too, the bearings 20 and 24 are connected to each other by two resilient, elastic tension bars 17 and 18 and are pretensioned in the direction of the axis of the driving toothed gear (not shown). The resilient, elastic bars 33', 34' and 35' run essentially potential to the direction of rotation of the driving toothed gear and are thus only under pressure or tension load in the direction of rotation and are thus relatively rigid, so that their function to counteract twisting is assured. In the direction radial to the axis of the driving toothed gear, however, they are flexible and thus permit a displacement of the bearings 20 and 24 in the direction of the axis of the driving toothed gear.

There are several pin recesses 37' provided at the inner wall of the housing. They are used, for example, to hold a plate (not shown) in a fixed position relative to the housing, and this plate, for example, also supports, among other things, the fixed-position parts of the rotation position sensors.

Figure 4A:
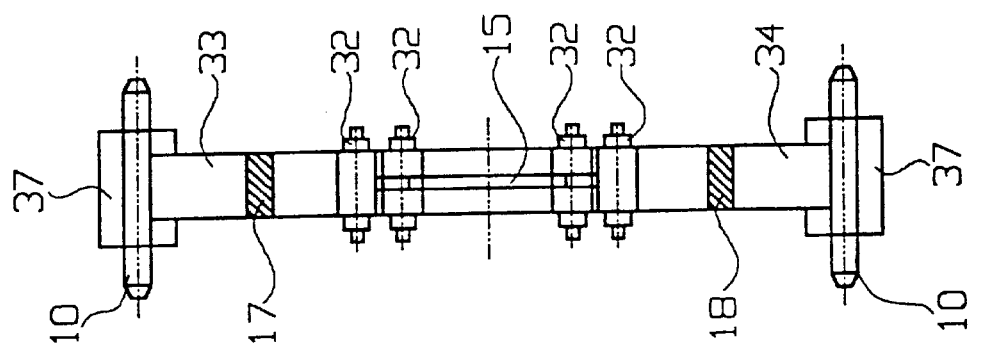
FIG. 4*a*, a cross section along line A—A in FIG. 4.
Figure 4:
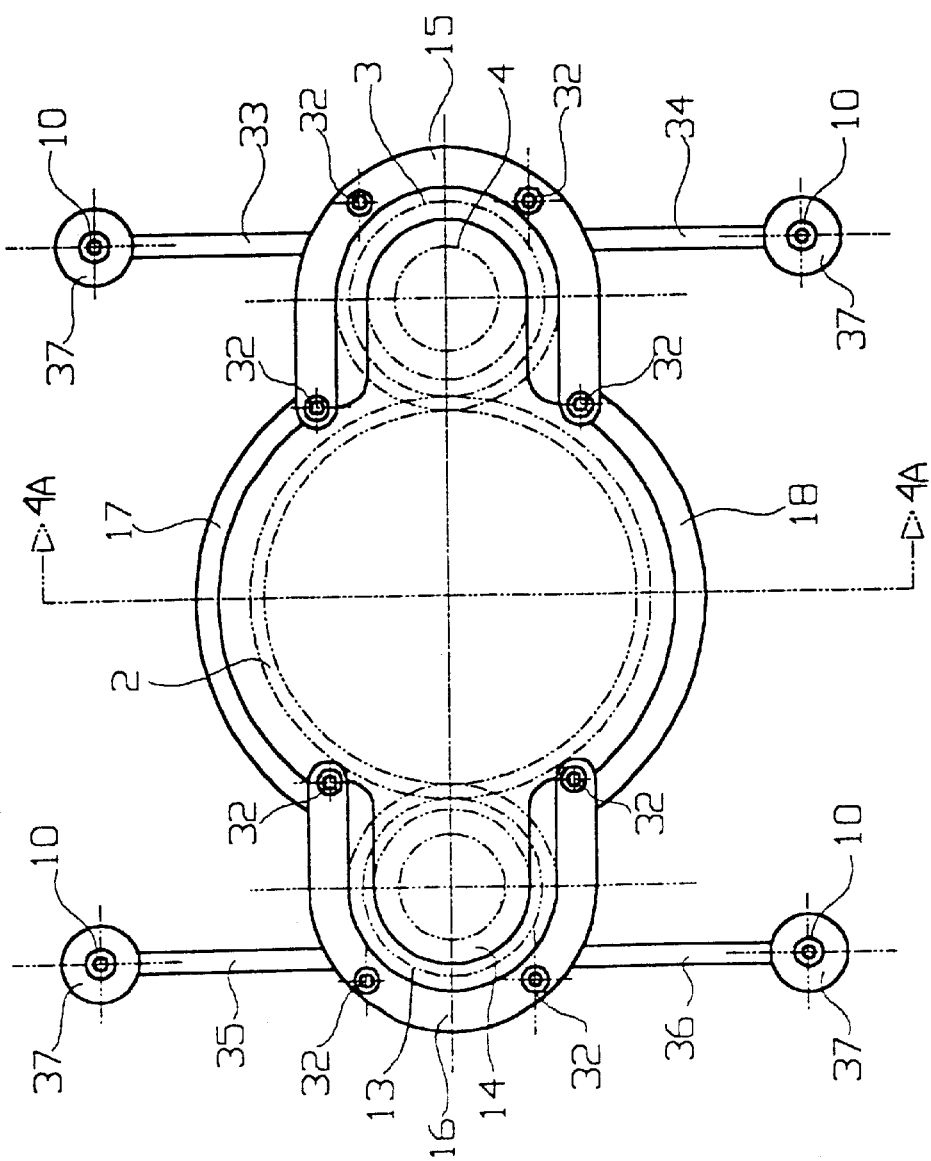
FIG. 4, a position sensor similar to FIG. 2 according to another embodiment example of the invention.

FIG. 4 shows a variant similar to FIG. 2, different in that the bearing elements 15 and 16, and also the tension bars 17 and 18 have a somewhat different shape and also may be composed of several parts and then connected together by a screw or rivet connection (see 32). However, reference numeral 32 can also represent spacer bolts that brace the bearings against a plate. The tension bars 17 and 18 are connected at each end to the ends of the bearings 15 and 16, respectively, and are bent into a circular segment so that they run essentially parallel to the outer contours of the driving toothed gear 2. Here again, the tension bars 17 and 18 pull or press the driven toothed gears 4 and 14 radially toward the middle of the driving toothed gear 2. The bearings 15 and 16 are each connected to two attachment arms 33, 34 and 35, 36, respectively. At their ends there is one pin holder 37 each, for attachment to and for securing to a pin 10 which acts to counteract twisting. Depending on the conditions of installation, one or more pins can be used. If several pins are used, the attachment arms 33–36 should be flexible and elastic in order to allow displacement of the bearing elements 15 and 16 radially to the center of the driving toothed gear 2. It is also possible to secure the pins 10 tightly to the pin holder 37 and to provide elongated holes in a (not shown) opposing bearing for the pins, where, e.g., a retaining plate similar to the plate 21 in FIG. 3 is provided, into which the pins can slide.

Figure 5:
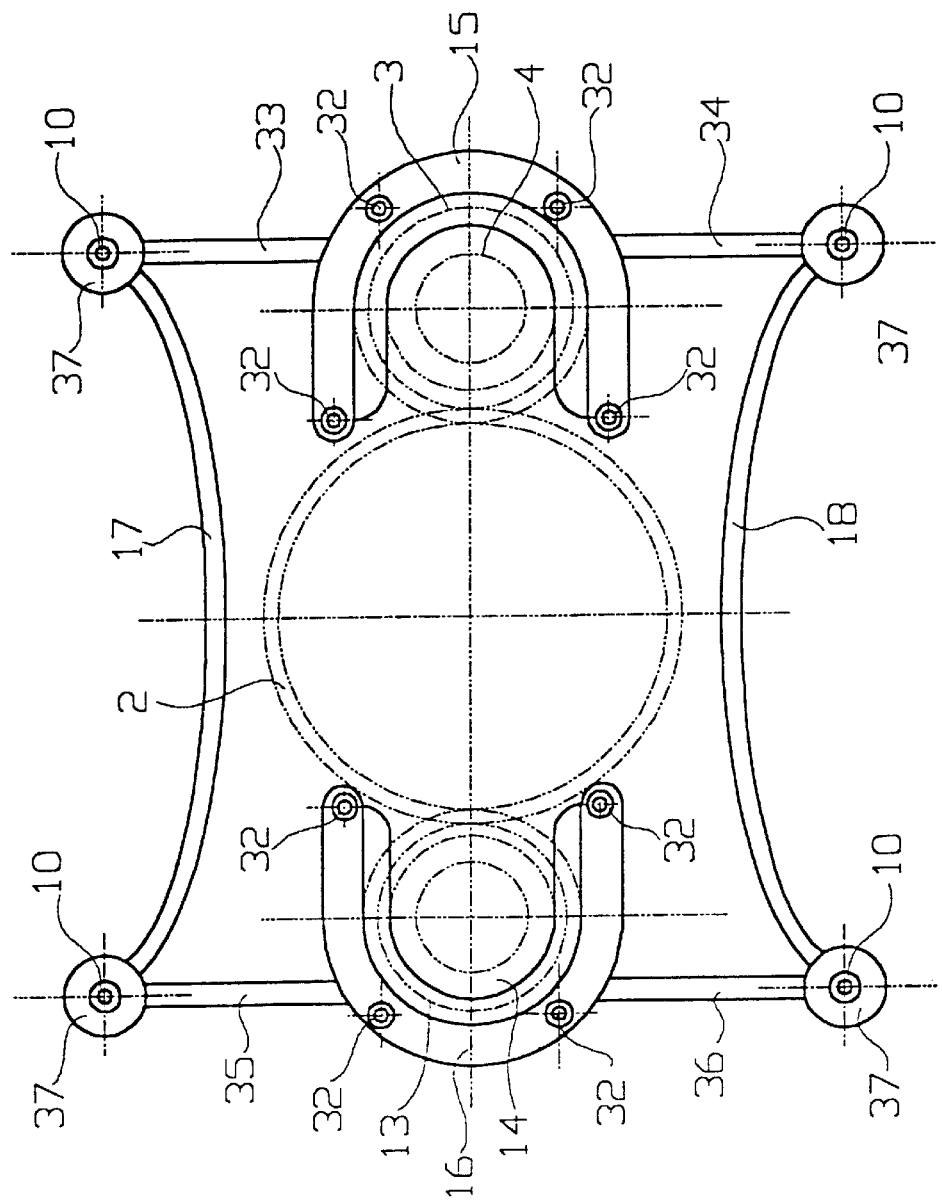
FIG. 5, a top view of a position sensor similar to FIG. 4, according to an additional embodiment example of the invention.

FIG. 5 shows a modification of FIG. 4, in which the tension bars 17 and 18 are attached pairwise: the free ends of the mounting arms are respectively across the tension bars 17 and 18. The tension bar 17 connects the attachment arms 33 and 35, the tension bar 18 connects the arms 34 and 36. The tension bars 17 and 18 curve inwardly, in the direction of the driving toothed gear 2. In this variant, the installation takes place such that the ends of the arms 33–36 can be displaced in a straight line parallel to a line running through the middle of the three toothed gears 2, 4 and 14. For example, pins 10 can be attached to the pin mount 37 and can slide in longitudinal holes of a retaining plate (not shown).

Figure 6:
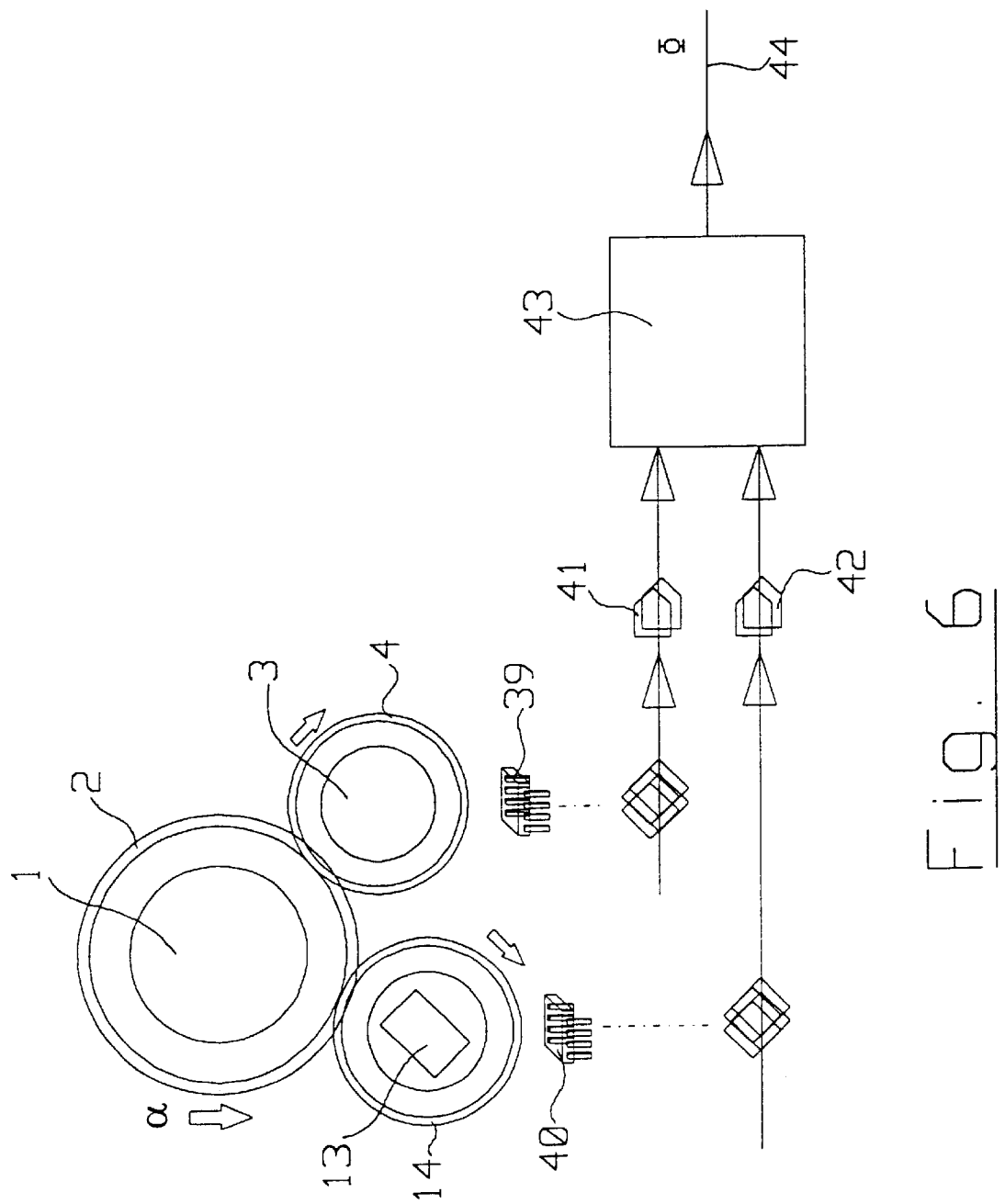
FIG. 6, a basic circuit diagram of the position sensor according to the invention.

FIG. 6 shows a basic diagram of the position sensor. An angle transducer to determine the absolute position, specifically across several revolutions, in one specific embodiment form features a central driver ring 1, 2 and also two rotors 3, 13 with different transmission ratios, which are driven by the driver ring. The precise mode of operation of his type of system will be explained below.

The two toothed gears 4 and 14 driven by the driving toothed gear 2 move the rotors 3 and 13, which are magnets in this case. They cooperate with stationary parts 39, 40 of the sensor modules which generate an electronic output signal as a fiction of the angle of rotation. The sensor modules 13, 40; 3, 39 can output an output signal that is linearly dependent on the angle of rotation. But it is also possible to use sensors which supply a sinusoidal and a cosinusoidal output signal, in a known manner, whereupon linear signals are then determined. The output signals $\Phi 1$ or $\Phi 2$ of the sensor modules 39 and 40 are each respectively sent via an analog/digital converter 41 and 42 to a microprocessor 43, which evaluates and processes the signals and generates an output signal $\Phi$ corresponding to the angle of rotation of the shaft 1 of its output 44. This signal can be output preferably in a digital form, but also in analog form, and can be determined as follows.

Each sensor module 3, 39 and 13, 40 outputs a periodical output signal as a function of the location (angle or travel). In this case, the particular output signals, after being processed by the microprocessor, are sawtooth-like functions of the angle or of location. The output signals of the sensor modules are supplied to the microprocessor 43, processed there and are output as a high precision, error-corrected output signal $\Phi_{fine}$, which is linear across the entire measurement range of $k_1$ periods of the sensor.

In a first step, a difference signal $\delta\Phi=\Phi_1-\Phi_2$

For the sake of clarity, it will be assumed hereinafter that the output signals of the rotors 3 and 13 are available as digital values and thus are in a convenient form for numerical processing. In order to keep the description as general as possible, both the total path or angle to be measured, and also the value range of the rotors 3 and 13 will also be normalized to the numerical value $2\pi$.

The difference signal $\delta\Phi$ has gaps of magnitude $-2\pi$, which originate from discontinuities in the two signals $\Phi 1$ and $\Phi 2$. The desired value range is between 0 and $+2\pi$, so that the gaps result in negative values. Thus, an initial correction can be performed by shifting the negative values of the signal $\delta\Phi$ upward by the amount $+2\pi$. Mathematically, this is expressed as follows:

if $\delta\Phi$ is negative, then we add $2\pi$

If $\delta\Phi$ is greater than or equal to 0, it remains unchanged.

The result of this first correction will be called $\Phi_c$. This corrected difference signal $\Phi_c$ can be viewed as an approximately accurate, absolute output signal across the entire evaluated path or angular range (useful range or measured range).

Based on the different errors in the sensors mentioned above, the two output signals $\Phi 1$ and $\Phi 2$ are not particularly accurate or linear. Thus, the corrected difference signal $\Phi_c$ is not particularly accurate or linear, but rather a certain waviness may appear. This error can be eliminated as follows. From the corrected difference signal $\Phi_c$ is determined the validity of the current period of the one sensor, i.e., the applicable period number multiplied by $2\pi$ which takes place by rounding off or truncating to the corresponding integer in the range of 0 to $k1-1$ and multiplication by $2\pi$. Thus a period number signal Pnr with the relation:

$$Pnr=2\pi \text{integer}(K1/2\pi\cdot\Phi_c),$$

where the function "integer" denotes the operation of truncating to the corresponding integer or of rounding down to the next integer.

From the current period number Pnr and the output signal $\Phi 1$ of one of the sensors, a fundamentally more accurate output signal than the difference signal $\delta\Phi$ defined above. With one addition:

$$\Phi f=Pnr\Phi 1$$

a highly accurate, absolute output signal $\Phi_{fn}$ is obtained which is likewise still error-laden. Due to the process of rounding off or truncation to an integer, gaps in the period will occur due to the non-ideal individual signals.

Due to a subtraction, therefore, an auxiliary quantity $\delta\Phi f$ is formed as the difference of the highly accurate but error-laden output signal $\Phi f$ minus the approximately accurate difference signal $\Phi_c$ multiplied by k1, that is:

$$\delta\Phi f=\Phi f-k_1=\Phi_c$$

Based on this auxiliary signal, period gaps can be found and corrected. Of course, this auxiliary signal may only move over a value range from $-\pi$ to $+\pi$. Therefore, in one comparison, a check is run to determine whether the auxiliary signal is $<-\pi$. If this is the case, then the highly accurate, absolute output signal $\Phi f$ will be corrected by $+2\pi$. However, if this condition is not satisfied, then in one comparison, a check is run to determine whether the auxiliary signal is $>\pi$. If this is the case, then the highly accurate, absolute output signal $\Phi f$ will be corrected by $-2\pi$. If also this condition is also not satisfied, then no period gap is present and the highly accurate, absolute output signal $\Phi_{fine}$ remains unchanged. The result then represents an error-corrected, absolute output signal $\Phi f$ across the entire measurement range. The evaluation presented heretofore is described in the older, unpublished DE patent application 198 49 554.

Even if the toothed gears are tensioned with respect to each other in the manner described above, the output signal $\Phi_{fine}$ can still have errors, whether due to manufacturing tolerances of the toothed gears, especially regarding tooth shape and distribution, or also due to wear. It is also possible that when using two driven sensors according to the embodiment examples in FIGS. 2 to 5, one driven toothed gear will engage with the driving toothed gear with no free play, while the other toothed gear will have some free play. To solve this problem, the invention in one refinement proposes that such errors be ascertained as a difference signal $|\epsilon|$ on the new part and stored, and then later during continuing operation, a corresponding, current difference signal $|\epsilon|$ can be determined and a check run to determine whether both values lie within a specified tolerance range.

The relationships will be discussed below between the useful, electrical angle of rotation $\Phi_1$ the number of periods $\Omega$ of the angle sensors, and the useful transmission ratios. Furthermore, the effect of phase errors on the individual sensors, caused, e.g., by mechanical play, will be examined and thus also one potential method will be explored for recognition of such errors.

The symbols used and their me g are presented below:

$\Phi$ Electrical angle of rotation, i.e., useful total range of the angle of rotation $\Omega$ Angle period of the used sensor elements, e.g., Pi ($\pi$) for AMR sensors $z_0$ Number of on of the driver ring $z_1$ Number of teeth on the driver toothed gear for angle sensor No. 1

$z_2$ Number of teeth on the driver toothed gear for angle sensor No. 2

$k_1$ Number of signal periods for sensor No. 1 in the electrical angle of rotation $k_2=k_1-1$ Number of signal periods for sensor No. 2 in the electrical angle of rotation $\Delta\alpha_i$ Phase error (e.g., due to slip of a driver toothed gear) for sensor i, i=1 or 2

$\Phi_{fine}$ Precision signal, i.e., the output signal output from the system $\Phi$ Approximate signal, auxiliary quantity for the determination of the output signal $\phi$ $\Delta\phi$ Angular error of the output signal due to a phase error $\Delta\alpha$ $\epsilon$ Angle difference signal for monitoring for phase errors $\alpha_i$ Phase angle of the sensor i ($0 \leq \alpha_I \leq 2\pi$)

First, the relationship between the electrical angle of rotation, the number of signal periods of the sensor elements and the transmission ratios of the toothed gears.

With

Sensor No. 1 $k1$ periods, transmission ratio $z_0/z_1$

Sensor No. 2 $k_2=k_1-1$ periods, transmission ratio $z_0/z_2$, we have $$\frac{z_o}{z_1} \cdot \Phi = k_1 \cdot \Omega \text{ i.e.,} \quad (1)$$

$$\frac{z_o}{z_1} = \frac{k_1 \cdot \Omega}{\Phi}$$

//b//

$$\frac{z_o}{z_2} \cdot \Phi = k_2 \cdot \Omega = (k_1 - 1) \cdot \Omega \text{ i.e.,} \quad (2)$$

$$\frac{z_o}{z_2} = \frac{(k_1 - 1) \cdot \Omega}{\Phi}$$

and also $$\frac{z_2}{z_1} = \frac{k_1}{(k_1 - 1)} \quad (3)$$

Sample sensor elements will be examined below for which $\Omega = \pi$.

Figure 7:
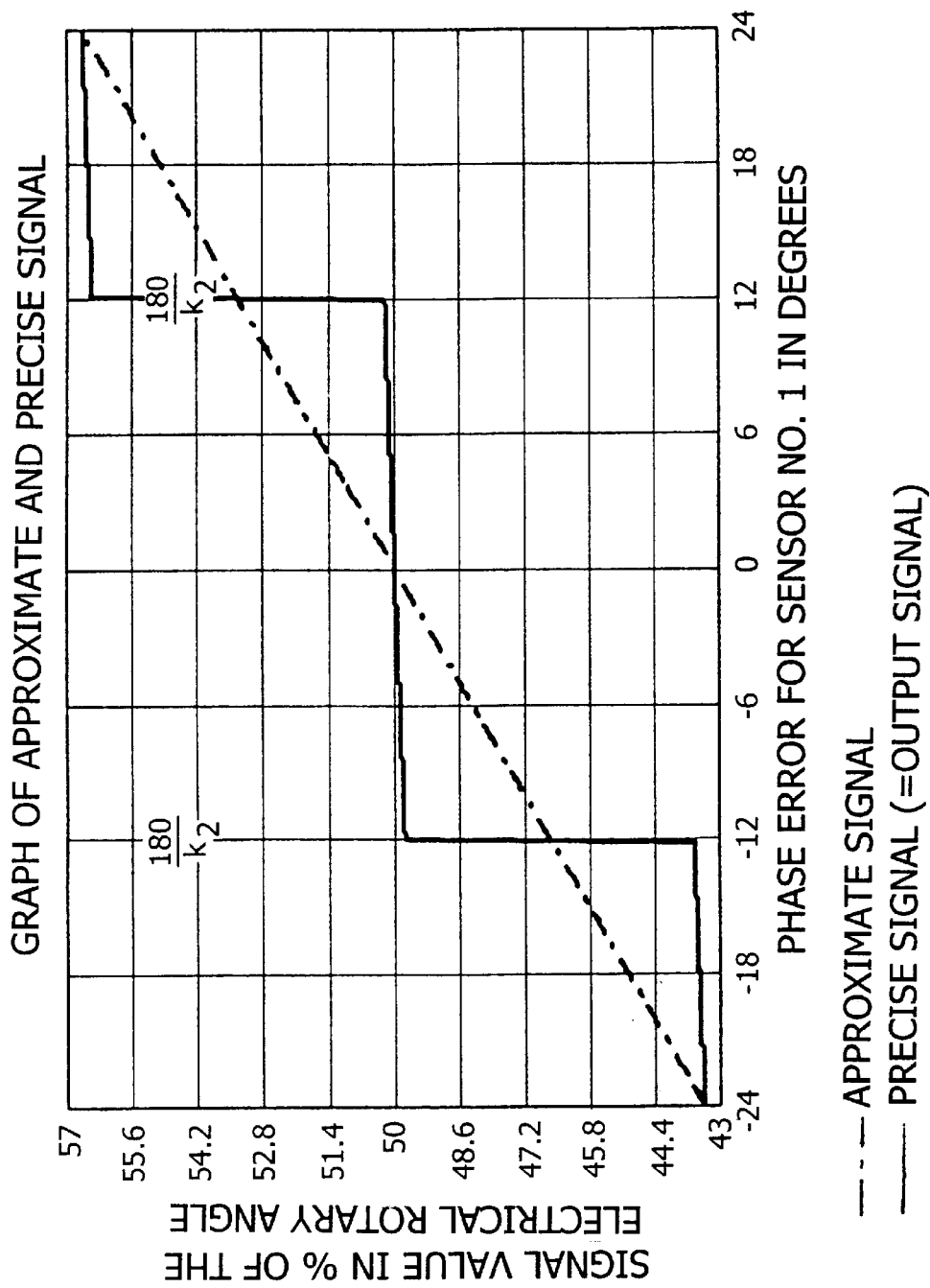
FIG. 7, a graph of output signals from the position sensor with two rotary position sensors as a function of the phase error of the first rotary position sensor.
Figure 8:
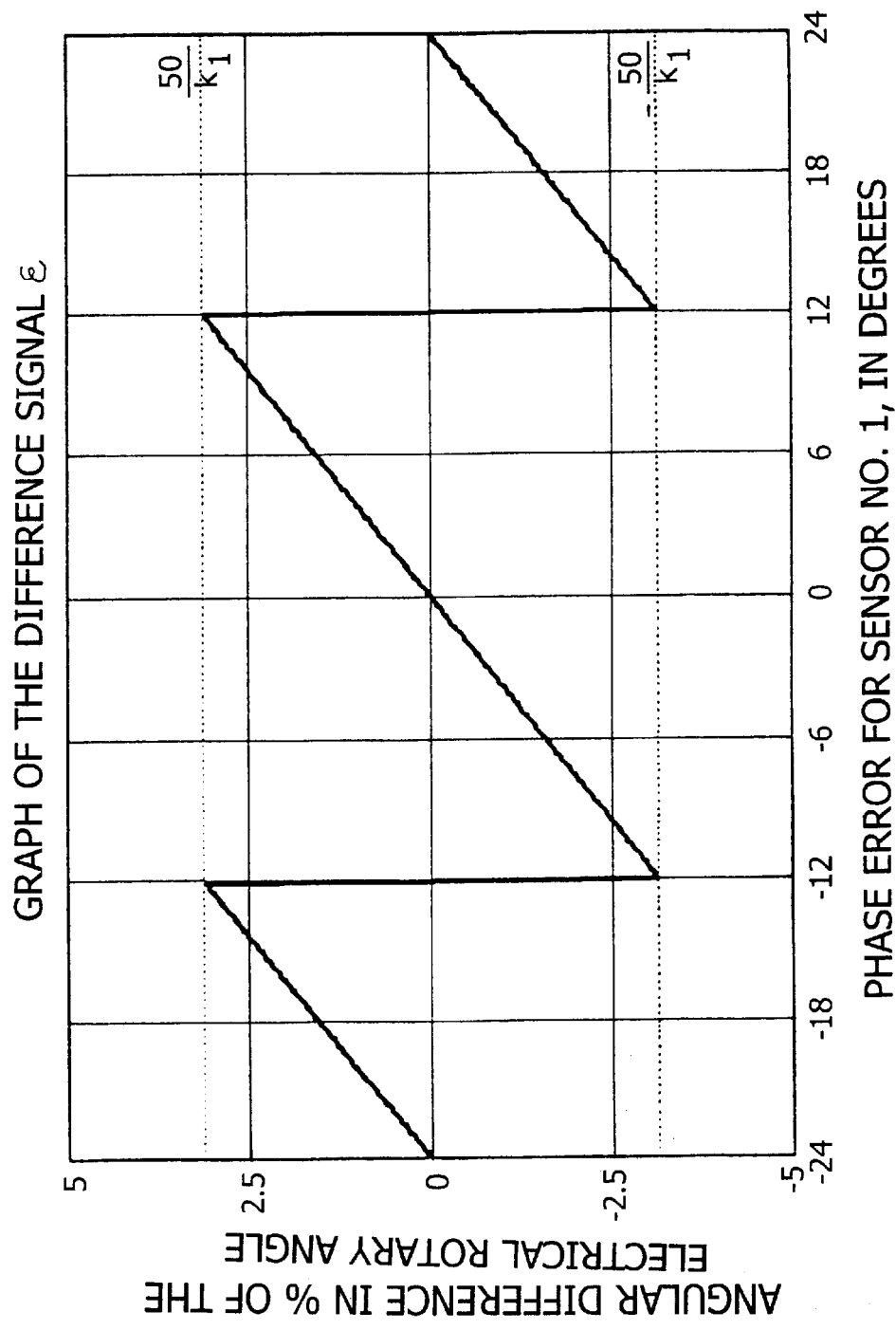
FIG. 8, a graph of the slope of a difference signal c used for error monitoring, as a function of the phase angle of the first sensor.

The behavior of the output signal (precision signal ($\Phi_{fine}$) for the occurrence of phase errors $\Delta\alpha$ is illustrated in FIGS. 7 and 8.

Simultaneous slippage at the two toothed gears $z_1$ and $z_2$ is expressed as hysteresis. However, if there is free play on only one of the two toothed gears, i.e., either $z_1$ or $z_2$, then the output signal exhibits linear behavior, at least in one range for $\Delta\alpha$ as a function of the given sensor:

Related to sensor No 1. (4)

$$-\frac{\pi}{k_2} \leq \Delta\alpha_1 \leq +\frac{\pi}{k_2}$$

Related to sensor No 2. (5)

$$-\frac{\pi}{k_1} \leq \Delta\alpha_2 \leq +\frac{\pi}{k_1}$$

The occurring angular errors $\Delta\Phi$ of the output signal have the following value for a phase error of:

a) sensor no. 1: $\Delta\Phi = \frac{1}{2} \cdot \Delta\alpha_1 \cdot \frac{z_1}{z_o} = \frac{1}{2} \cdot \Delta\alpha_1 \cdot \frac{\Phi}{k_1 \cdot \pi} = \frac{\Omega}{2\pi} \cdot \Delta \propto_A \cdot \frac{Z_1}{Z_o}$ (The factor ½ applies for the case under study here, for elements with the period $\Omega=\pi$). With we have $$|\Delta\alpha_1| \leq \frac{\pi}{k_2} = \frac{\pi}{(k_1 - 1)} \quad (6)$$

$$|\Delta\Phi| \leq \frac{1}{2} \cdot \frac{\pi}{(k_1 - 1)} \cdot \frac{\Phi}{k_1 - \pi}$$

$$\left|\frac{\Delta\Phi}{\Phi}\right| \leq \frac{1}{2 \cdot (k_1 - 1) \cdot k_1}$$

Sensor no. 2 $|\Delta\Phi|$ (sensor No. 2 used "only" to determine the period of sensor No. 1)

To check for any existing phase errors, a relative quantity $\epsilon$ is defined as $$\varepsilon := k_1 \cdot \frac{\Phi_{Grob} - \Phi_{Fem}}{\Phi} \quad (7)$$

As long as the occurring phase errors are in the limits defined by the equations (4) and (5), then the quantity $\epsilon$ is a linear function of the phase error, and we have:

$$|\varepsilon| \leq \frac{\pi}{2\pi \cdot k_1} = \frac{0.5}{k_1} \qquad (8)$$

Figure 9:
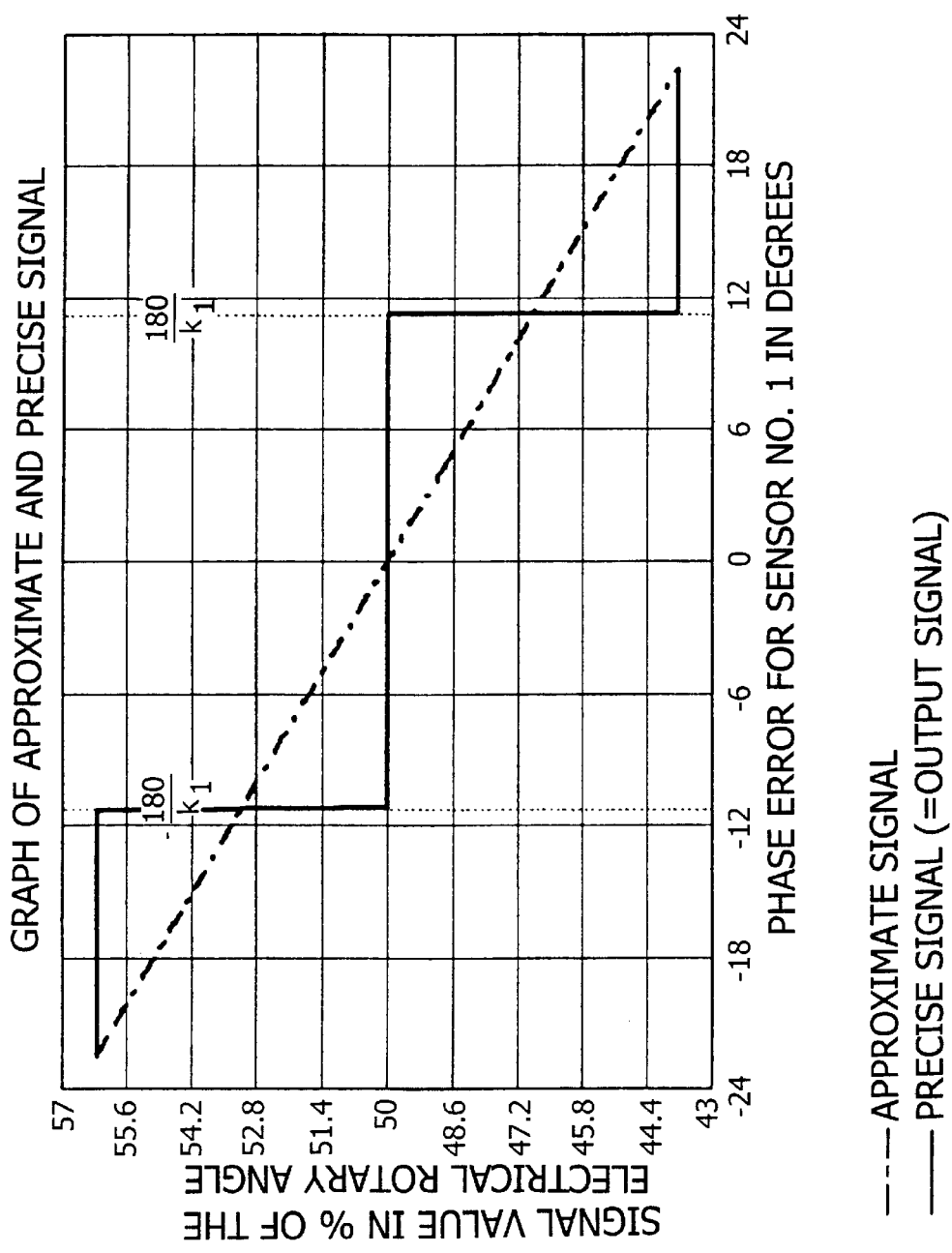
FIG. 9, a graph of signal values as a function of the phase error of the second sensor, and FIG. 10, a graph of the slope of the difference signal a as a function of the phase error of the second sensor.
Figure 10:
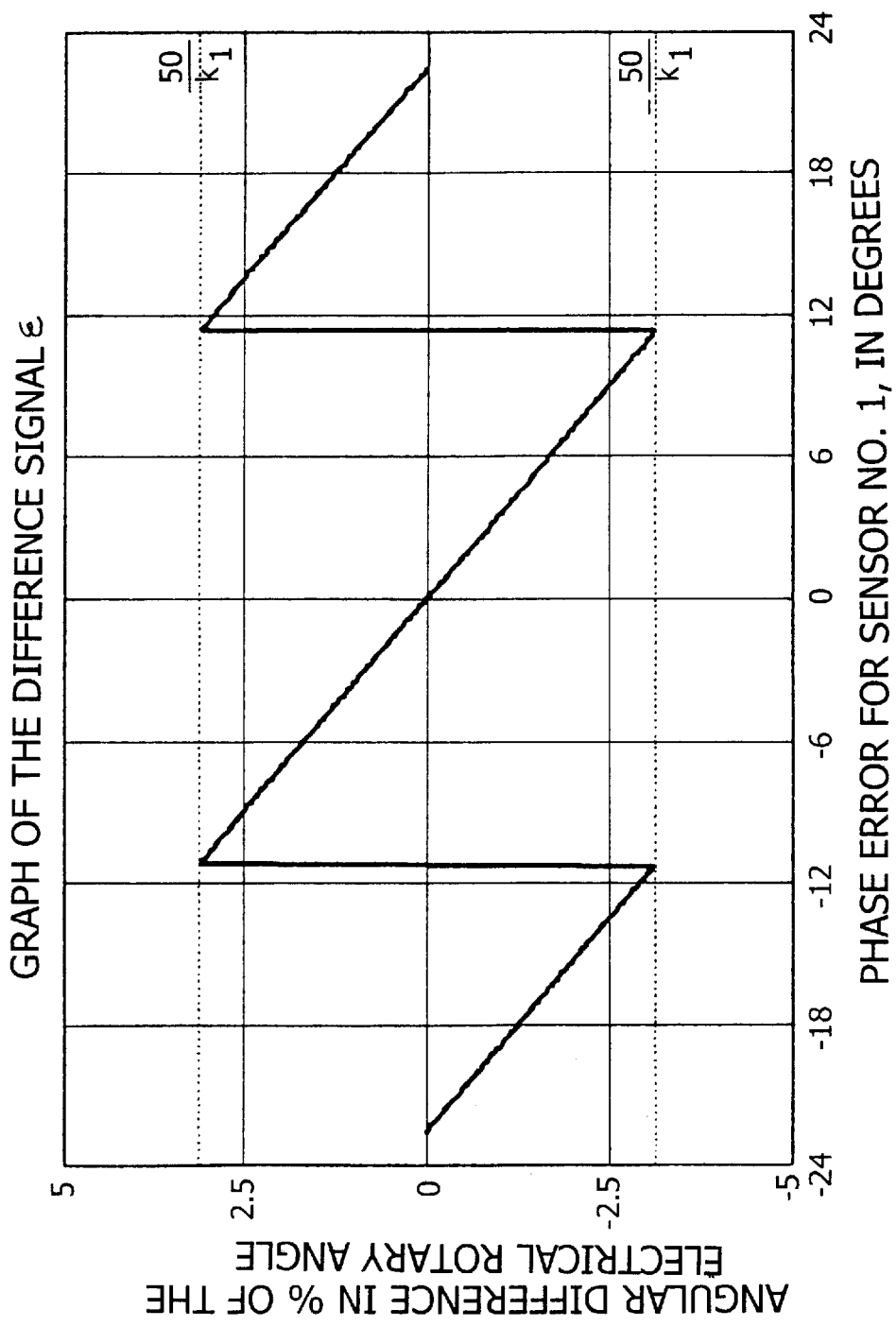

In FIGS. 7–10, the effect of phase errors on the output signals is presented in graphic form, separately for the two cases of a phase error for sensor No. 1 (FIG. 7) or for sensor No. 2 (FIG. 9). The calculation pertains to an example with $k_1=16$ periods. The driver ring is thus located in the central position, i.e., the output signal amounts to a nominal $\Phi_{fine}=50\%$.

By monitoring a suitably selected threshold value for $|\varepsilon|$, in principle, the slip or similar factor can be recognized for one of the two sensor toothed wheels, and thus the error signal output. In order to minimize the required computer expense, the discussion is limited to a preferred position, e.g., for a steering angle sensor for motor vehicles, to the straight ahead setting, so that an error will be recognized when passing over this position with $\Phi_{fine}$–60% of the range of the electrical angle of rotation.

The following mathematical relation is set up for the phase errors and their effects:

Transforming the expression for the error magnitude $\varepsilon$:

$$\varepsilon = \frac{1}{\Phi} \cdot \Delta\alpha \cdot \frac{d}{d\alpha}(k_1 \cdot \Phi_{Grob} - \Phi_{Fein}) \quad (\varepsilon \text{ should be linear in } \alpha)$$

In a sufficiently restricted interval for $\Delta\alpha$, the functions $\Phi$ and $\Phi_{fine}$ can be written as $$\Phi = \Phi_1 - \Phi_2 + c_1$$
$$\Phi_{fine} = \Phi_1 + c_2$$

with $\Phi_1$, $\Phi_2$ as the (linear) output signals for the individual sensors 1 and 2, which serve as input signals for calculation of the absolute position, and $c_1$, $c_2$=constants. For the discussion below, for simplicity $\Phi_1$, $\Phi_2$ are set here as phase angles in the range of $0 \leq \Phi_1, \Phi_2 \leq 2\pi$. Thus, the angle a changes by 360°. when the associated toothed gear is turned by $\Omega$. The useful range of rotation is normalized to $\Phi = k_1 \cdot 2\pi\varepsilon$ can then be written as $$\boxed{\varepsilon = \frac{1}{\Phi} \cdot \Delta\alpha \cdot \left[(k_1 - 1) \cdot \frac{d\Phi_1}{d\alpha} - k_1 \cdot \frac{d\Phi_2}{d\alpha}\right]}$$

Determination of the function range and value range for $\varepsilon$:

$\varepsilon$ is only linear in a relatively narrow range about $\Delta\alpha=0$ and thus evaluable for error recognition. The skip positions of $\delta$ are identical with those of $\Phi_{fine}$ and can be derived from the calculation procedure for $\Phi_{fine}$ (see the $2^{nd}$ correction step in the above description of the evaluation method).

Discontinuities occur when $|\varepsilon \cdot \Phi| = \pi$, i.e., $$|k_1 \cdot \Phi_{Grob} - \Phi_{Fein}| = \pi$$

$$\Delta\alpha \cdot \left[(k_1 - 1) \cdot \frac{d\Phi_1}{d\alpha} - k_1 \cdot \frac{d\Phi_2}{d\alpha}\right] = \pi$$

Phase error for sensor No. 1, i.e., $$\frac{d\Phi_1}{d\alpha_1} = 1, \quad \frac{d\Phi_1}{d\alpha_1} = 0 \quad (\Phi_2 = const)$$

Skips occur at $$|\Delta\alpha| \cdot (k_1 - 1) = \pi,$$

i.e., $$|\Delta\alpha_1| = \frac{\pi}{k_1 - 1} = \frac{\pi}{k_2}$$

The associated relative error in angle of rotation of the entire system is:

$$\frac{|\Delta\Phi|}{\Phi} = \frac{|\Delta\alpha|}{k_1 \cdot 2\pi} = \frac{1}{k_1 \cdot 2\pi} \cdot \frac{\pi}{k_2} = \frac{1}{2 \cdot k_1 \cdot (k_1 - 1)}$$

In the above example with $k_1=16$ periods for 4 revolutions:

$$\frac{\Delta\alpha}{\Phi} = \frac{1}{2 \cdot 16 \cdot 15} = 0.2\ \%, \text{ corresponds to } 3° \text{ for an angle of rotation of } 1440°.$$

corresponds to 3° for an angle of rotation of 1440°.

The possible evaluation values for $\varepsilon$ are thus limited in this example to the angular error range of ±3°.

The maximum value of $\varepsilon$ is defined by $$|\varepsilon| = |\Delta\alpha_2| \cdot \frac{d\varepsilon}{d\alpha_2} \qquad |\varepsilon| = \frac{1}{\Phi} \cdot |\Delta\alpha_2| \cdot (k_1 - 1)$$

$$|\varepsilon| = \frac{1}{k_1 \cdot 2\pi} \cdot \pi = \frac{1}{2 \cdot k_1}$$

In the above example with $k_1=16$ periods for 4 revolutions:

$$|\varepsilon| = \frac{1}{32} = 3.125\%,$$

corresponding to 45° for an angle of rotation of 1440°.

The phase error for sensor No. 2, i.e., $$\frac{d\Phi_1}{d\alpha_2} = 0, \quad \frac{d\Phi_2}{d\alpha_2} = 1 \quad (\Phi_1 = const)$$

The skips occur at $$|\Delta\alpha_2| \cdot k_1 = \pi,$$

i.e., $$|\Delta\alpha_2| = \frac{\pi}{k_1}$$

The associated relative rotary angle error for the entire system, as in case a), is:

$$\frac{|\Delta\alpha|}{\Phi} = \frac{|\Delta\alpha|}{k_2 \cdot 2\pi} = \frac{1}{k_2 \cdot 2\pi} \cdot \frac{\pi}{k_1} = \frac{1}{2 \cdot k_1 \cdot (k_1 - 1)}$$

Analogously to case a), the maximum value of $\epsilon$ is $$|\varepsilon| = \frac{1}{\Phi} \cdot |\Delta\alpha| \cdot k_1, \quad |\varepsilon| = \frac{1}{k_1 \cdot 2\pi} \cdot \pi = \frac{1}{2 \cdot k_1}$$

By monitoring $|\epsilon|$ errors can thus be recognized, such as a slippage of one of the two sensor toothed gears, and an error signal derived. In this case, the quantity $|\epsilon|$ is determined on the new part and stored together with a threshold value. During operation of the position sensor, the current $|\epsilon|$ is determined continuously and a check is run to determine whether it differs more than the threshold value from the stored $|\epsilon|$ of the new part, whereupon an error signal will be output. This error signal can, for example, switch off a controller (e.g., a driving dynamics controller in a motor vehicle which is processing a steering angle signal) and/or it can output a warning signal to indicate that the sensor should be replaced.

The invention plus the features for error recognition can be applied not only to the rotary position sensors in FIGS. 1 to 6, but also to linear path transducers when they are designed according to the same functional principle.

What is claimed is:

1. Position sensor to determine the position of a moving object, wherein a rotary position sensor is coupled by means of a toothed gear to a toothing on the moving object, the toothed gear and the toothing of the moving object being under mutual elastic tension, wherein the moving object is a rotary shaft and the toothing is a driven toothed gear connected to the shaft, and two rotary position sensors are coupled via driven toothed gears to the driving toothed gear, wherein the rotary position sensors are seated in bearing elements and the bearing elements are pressed by means of resilient, elastic tension bars in the direction of the shaft.

2. Position sensor according to claim 1 wherein the axes of rotation of the rotary position sensors and of the shaft are located in a common plane.

3. Position sensor according to claim 1 wherein the rotary position sensors are seated on a common bearing element and the bearing element is connected by means of resilient, elastic tension bars to an additional bearing element which is braced by means of an additional driven toothed gear against the driving toothed gear.

4. Position sensor according to claim 3 wherein all driven toothed gears are pretensioned in the direction of the midpoint of the driving toothed gear.

5. Position sensor according to claim 4 wherein the driven toothed gears are fixed in position with respect to the driving toothed gear by means of a torsion stop in such a manner that its axis of rotation is held in place in the circumferential direction of the driving toothed gear and can only move radially relative to the midpoint of the driving toothed gear.

6. Position sensor according to claim 5 wherein the driven toothed gears, the bearing elements and the tension bars are designed as one structural unit which can be displaced linearly along a retaining plate.

7. Position sensor according to claim 6 wherein an error signal ($\epsilon$) for the new part is ascertained at a factory which is proportional to the measured error the the position sensor, the error signal ($\epsilon$) and a preset limit value are stored, and, during subsequent operation, a current error signal ($\epsilon_{actual}$) is determined, and a check is run to determine whether the two error signals ($\epsilon$, $\epsilon_{actual}$) differ by more than the stored limit value, whereupon a warning signal is generated.

8. Position sensor according to claim 7 wherein the factory-ascertained error signal ($\epsilon$), is determined only for a preset rotary position, and the check of the current error signal ($\epsilon_{actual}$) likewise occurs only for the preset rotary position.

* * * * *